United States Patent
Rosen

(10) Patent No.: US 11,254,390 B2
(45) Date of Patent: Feb. 22, 2022

(54) HYDROFOIL UNIT FOR A MOBILE OFFSHORE APPARATUS

(71) Applicant: Johannes Rosen, Mülheim (DE)

(72) Inventor: Johannes Rosen, Mülheim (DE)

(73) Assignee: RWE Renewables GmbH, Essen (DE)

( * ) Notice: Subject to any disclaimer, the term of this patent is extended or adjusted under 35 U.S.C. 154(b) by 0 days.

(21) Appl. No.: 17/307,491

(22) Filed: May 4, 2021

(65) Prior Publication Data
US 2021/0253198 A1 Aug. 19, 2021

Related U.S. Application Data

(63) Continuation of application No. PCT/EP2019/077499, filed on Oct. 10, 2019.

(30) Foreign Application Priority Data

Nov. 6, 2018 (DE) ...................... 10 2018 127 650.8

(51) Int. Cl.
*B63B 1/28* (2006.01)
*B63H 25/42* (2006.01)

(52) U.S. Cl.
CPC ............. *B63B 1/283* (2013.01); *B63H 25/42* (2013.01)

(58) Field of Classification Search
CPC .... B63B 1/00; B63B 1/16; B63B 1/18; B63B 1/24; B63B 1/242; B63B 1/248; B63B 1/26; B63B 1/28; B63B 1/283; B63B 1/285; B63B 1/30; B63H 25/42; B63H 2025/425; B63H 25/44; B63H 25/46; B63H 25/48

USPC ....... 114/271, 273, 274, 275, 278, 280, 281, 114/282, 284, 285; 440/61 S, 66, 84
See application file for complete search history.

(56) References Cited

U.S. PATENT DOCUMENTS

| | | | | |
|---|---|---|---|---|
| 3,082,975 A | * | 3/1963 | Cardwell | B64C 35/00 244/2 |
| 3,191,567 A | * | 6/1965 | Ask | B63B 1/286 114/275 |
| 4,056,074 A | * | 11/1977 | Sachs | B63B 1/242 114/280 |
| 5,373,800 A | * | 12/1994 | Steinberg | B63H 11/08 114/282 |
| 2005/0145155 A1 | | 7/2005 | Levine | |
| 2018/0201343 A1 | | 7/2018 | Lagarrigue et al. | |

FOREIGN PATENT DOCUMENTS

| | | |
|---|---|---|
| DE | 202014003766 U1 | 6/2014 |
| FR | 2063498 A5 | 7/1971 |
| KR | 101 411 508 B1 | 6/2014 |

* cited by examiner

*Primary Examiner* — Daniel V Venne
(74) *Attorney, Agent, or Firm* — Reinhart Boerner Van Deuren P.C.

(57) ABSTRACT

A hydrofoil device for a mobile offshore apparatus, in particular, a watercraft. The hydrofoil device includes at least one base body with at least one connection unit which is arranged for connecting the hydrofoil device to the mobile offshore apparatus. At least one hydrofoil is arranged on the base body. At least one flow generator is arranged to generate a flow around the hydrofoil. The hydrofoil device in its intended use is rotatable at least about a substantially vertical axis of rotation depending on at least one control data set that can be provided.

16 Claims, 4 Drawing Sheets

HYDROFOIL UNIT FOR A MOBILE OFFSHORE APPARATUS

CROSS-REFERENCE TO RELATED PATENT APPLICATIONS

This patent application is a continuation of International Application No. PCT/EP2019/077499, filed on Oct. 10, 2019, which claims the benefit of priority to German Patent Application No. 10 2018 127 650.8, filed Nov. 6, 2018, the entire teachings and disclosures of both applications are incorporated herein by reference thereto.

FILED OF INVENTION

The application relates to a hydrofoil device for a mobile offshore apparatus, in particular, a watercraft. In addition, the application relates to a mobile offshore apparatus and a method for operating a mobile offshore apparatus.

BACKGROUND

Wind power systems and wind farms, respectively, with a plurality of wind turbines are known. Here, a wind turbine is configured to convert the kinetic energy of the wind into electrical energy. Offshore wind energy systems and offshore wind farms, respectively, are increasingly installed due to the higher wind safety and/or the higher wind speeds.

In offshore wind energy systems with a plurality of stationary offshore apparatuses, such as offshore wind turbines, offshore substations, offshore measuring stations, etc., in particular, maintenance and/or repair procedures for a corresponding offshore apparatus are complex and cost-intensive. The main reason for this is the offshore position of such an apparatuses.

It is known to use mobile offshore apparatuses, in particular, watercrafts, such as catamaran structures, for maintenance and/or repair operations in order to transport material and/or personnel to a stationary offshore apparatus. A respective watercraft is also called an offshore crew transfer vessel. The preferred catamaran structures, which may comprise a hull device with at least two hulls and a transport and/or landing platform arranged thereon, may have a length between 10 m and 30 m, preferably between 20 and 30 m (e.g., approximately 24 m).

For the landing process to a further offshore apparatus, a respective watercraft is pressed by engine power to the landing device (also called boat landing) of the further offshore apparatus. The height of the transport platform and landing platform, respectively, of the mobile offshore apparatus with respect to the water surface is selected in such a way that it corresponds to the height of the landing device of the further (stationary) offshore apparatus.

However, the previously described landing process has disadvantages. In particular, the respective maneuver is only feasible up to a specific wave height (e.g., approximately 1 to 1.5 m (significant)). If the swell exceeds this wave height, the landing procedure can no longer be performed in a safe manner due to the increased movement of the mobile offshore apparatus caused by this swell. For example, the swell may cause heeling of the mobile offshore apparatus about the longitudinal axis of the mobile offshore apparatus and/or pitching of the mobile offshore apparatus about the transverse axis of the mobile offshore apparatus. This prevents a safe landing at the further offshore apparatus.

For example, a previously described catamaran structure is pressed with its bow against the stationary offshore apparatus during the landing process. From the specific (significant) wave height (e.g. approximately 1 to 1.5 m), there is a risk of slipping of the bow of the catamaran construction. This is accompanied by corresponding risks of injury to the personnel. Accordingly, with such mobile offshore apparatuses, landings and thus the performing of maintenance processes and/or repair processes are not possible with a swell where the specific (significant) wave height (e.g. approx. 1.5 m) is reached or exceeded. This leads to an unwanted prolongation of maintenance and/or repair processes. This is particularly problematic if the operation of the offshore apparatus to be repaired and/or maintained (e.g. a wind turbine) has to be interrupted until the corresponding maintenance and/or repair process is completed.

Passive or hydraulically or electrically driven mechanisms and corresponding controls of actively compensated gangway systems (walk to work), such as Ampelmann, Uptime, etc., are also known for compensating the wave-induced movements of mobile offshore apparatuses. The disadvantages of these apparatuses are the complex construction and the considerable weight of these systems, so that they can only be used on larger ships.

BRIEF SUMMARY OF THE INVENTION

Therefore, the object of the application is to provide a device for a mobile offshore apparatus, in particular, for a watercraft, for a landing at (to) a further offshore apparatus, which allows a safe landing at the further offshore apparatus even with (in) a swell with higher wave heights.

The object is solved according to a first aspect of the application by a hydrofoil device for a mobile offshore apparatus, in particular, a watercraft, according to claim 1. The hydrofoil device comprises at least one base body with at least one connection unit. The connection unit is configured to connect the hydrofoil device to the mobile offshore apparatus. The hydrofoil device comprises at least one hydrofoil arranged on the base body. The hydrofoil device comprises at least one flow generator arranged on the base body. The flow generator is configured to generate a surround flow of the hydrofoil. The hydrofoil device is, in its intended use, rotatable about at least one substantially vertical axis of rotation as a function of at least one providable control data set.

According to the application, it has been recognized that a landing operation can be carried out safely even in a swell with a wave height above the specific (significant) wave height of, for example, 1.5 m, if a mobile offshore apparatus comprises two or more hydrofoil devices according to claim 1. By the hydrofoil device having a flow generator, a surround flow of the at least one hydrofoil can be actively generated by the hydrofoil device and thus a lifting of the mobile offshore apparatus mounted to the connection unit in the intended use can be caused. In particular, the lifting can be carried out such that the waves pass below a hull device of the mobile offshore apparatus. The ability to control the hydrofoil device about a substantially vertical axis of rotation, according to the application, enables a precise landing at a further offshore apparatus. Accordingly, the use of hydrofoil devices according to the application enables a safe landing of the mobile offshore apparatus at a further offshore apparatus even in (with) a swell with (significant) wave heights greater than 1.5 m.

In the present context, a mobile offshore apparatus basically means any movable and floating body, such as a mobile offshore platform. In particular, a mobile offshore apparatus may be a watercraft with a drive system. A watercraft may be a wind-powered and/or engine-powered watercraft having a hull device comprising at least one hull.

The hydrofoil device comprises a base body which comprises at least one connection unit. In particular, the connection unit is configured to mechanically mount the hydrofoil device to the mobile offshore apparatus. For example, the connection unit can be a support that can be mounted to the hull device and the body, respectively, of the mobile offshore apparatus. Also, the connection unit may be a mounting receptacle in which, for example, a support or the like of the hull device may be inserted and by means of which the support may be mounted to the hydrofoil device. Mechanical mounting (fastening) methods may include, for example, screw connections, welded connections, etc.

In addition, at least one hydrofoil is arranged on the base body. For example, the base body and the at least one hydrofoil may be integrally formed or the at least one hydrofoil may be mounted to the base body by a screw connection, bonding, welding, etc. A hydrofoil is configured to generate a dynamic lift when a fluid, in particular, (sea) water, flows around it. The function of the at least one hydrofoil is, in particular, to generate a sufficiently large force perpendicular to the surround flow direction by influencing the surround flow of it by the hydrofoil shape. This force is the buoyancy that lifts the mobile offshore apparatus out of the water. A hydrofoil may also be referred to as a "hydrofoil".

According to the application, in the intended use of the hydrofoil device, the surround flow is generated by a flow generator arranged on the main body of the hydrofoil device (itself). As will be described in more detail, this and the rotatable controllability of the hydrofoil device make it possible to lift the mobile offshore apparatus. In particular, a lifting is (already) possible at a speed of the offshore apparatus of approximately 0 km/h, so that a landing process can be carried out in a safe manner.

The at least one flow generator can be, for example, a propeller or an impeller (water jet propulsion). In particular, the flow generator may be attached to one end of the longitudinal extension of the base body. The flow generator may be formed such and arranged that in the intended use a flow or a surround flow of the at least one hydrofoil is generated which is sufficient to cause a buoyancy that lifts the mobile offshore apparatus out of the water.

In particular, the hydrofoil device according to the application is a controllable hydrofoil device. Thus, according to the application, it has been recognized that a landing process requires that the hydrofoil device be rotatable about a substantially vertical axis of rotation. In particular, an angle of rotation may be adjustable between 0° and 360°. In particular, at least one (set) angle of rotation may be specified as a control parameter in the control data set. According to this control parameter, the rotation of the hydrofoil device can be adjusted. For example, the connection unit, in particular, a support, can be rotatable. Also, the support may be rotationally fixed and only the base body attached to the support may be rotatable. It shall be understood that suitable rotary actuators and rotary drives, respectively, may be provided.

According to a first embodiment of the hydrofoil device according to the application, the base body may comprise at least one drive unit. In a preferred embodiment, at least two drive units can be arranged next to each other in front of or behind the hydrofoil in the direction of the lateral extension of the hydrofoil (span). The drive unit may be configured to drive the flow generator. Preferably, the drive unit may be integrated in a housing of the main body. A compact hydrofoil device can be provided. In addition, the power transmission from the drive unit to the at least one flow generator can be easily established. Particularly preferably, the drive unit can be a (controllable) electric motor. In the case of an electric motor, the power supply is particularly simple. In addition, a landing process or the like is limited in time, so that the drive unit only has to be activated temporarily during the corresponding process. An electric motor is particularly suitable for this purpose. Alternatively, a motor, in particular an electric motor, but also an internal combustion engine or the like, can also be arranged in the hull, which can be connected to the at least one flow generator via an operative connection, in particular, comprising a reversing gear.

As already described, the hydrofoil device is a controllable hydrofoil device. According to a particularly preferred embodiment of the hydrofoil device according to the application, the hydrofoil device may be configured, in its intended use, to change the angle of attack of the hydrofoil as a function of at least one providable control data set. For example, the hydrofoil device may comprise an actuator unit. The actuator unit may be arranged in the main body. The control data set can comprise a (set) angle of attack (e.g. between −90° and +90° with respect to a horizontal reference plane) as a control parameter. Depending on this control parameter, the actuator unit can change the angle of attack of the at least one hydrofoil of the hydrofoil device.

Alternatively or additionally, in its intended use, the hydrofoil device may be configured to change the angle of attack of at least one end strip flap of the hydrofoil mounted on the hydrofoil device as a function of at least one providable control data set. For example, on the hydrofoil device at least one adjustable end strip flap can be mounted that is adapted to change the direction of water flow (depending on the angular position). The at least one end strip flap of the hydrofoil device may be adjustable depending on the control data set to change the angle of attack.

Alternatively or additionally, in its intended use, the hydrofoil device may be configured to change the drive (propulsive) power of the flow generator as a function of at least one providable control data set. In other words, the speed of a propeller or impeller may be controllable. In particular, the previously described electric drive unit may be controllable. The control data set may comprise a set power, set speed, etc. as control parameters for changing the drive power according to the application. The changing of the drive power of the flow generator can, in particular, be performed by the drive unit according to the at least one provided control parameter.

Preferably, a control data set may comprise as control parameters at least a (set) angle of rotation, a set power or set speed (or the like), and a (set) angle of attack. It shall be understood that several control data sets, which may comprise different control parameters, may be generated.

In order to set the angle of attack with respect to the surround flow and the setting angle difference, respectively, between the flow generator and the hydrofoil, both the flow generator and the hydrofoil may be formed to rotate about their transverse axis. The hydrofoil can also have flaps, also called end strip flaps, at its end strip that can be rotated partially or continuously across the span. The adjustment of the angle of attack, the setting angle difference and/or the end strip flaps can, individually or in combination with each other, cause a lift (buoyancy) change of the hydrofoil. Also, a rotational speed change of the at least one flow generator can be used to change the surround flow speed and thus change the lift (buoyancy) force.

Said control parameters can be generated in such a way that the mobile offshore apparatus reaches a specific (desired) position location and, in particular, maintains it for a specific period of time. In particular, corresponding control data sets can be generated (almost) continuously in order to achieve the specific (desired) position location (attitude position) and, in particular, to maintain it for the specific period of time. In particular, the position location is the location of the mobile offshore apparatus to be maintained during a landing process. The position location of the mobile offshore apparatus may, in particular, be defined and, in particular, predetermined by at least one following criterion:

- a heel angle criterion of the mobile offshore apparatus with respect to the longitudinal axis of the mobile offshore apparatus,
- a pitch angle criterion of the mobile offshore apparatus with respect to the transverse axis of the mobile offshore apparatus,
- a yaw angle criterion of the mobile offshore apparatus with respect to the vertical axis of the mobile offshore apparatus,
- a speed criterion of the mobile offshore apparatus,
- a bearing criterion of the mobile offshore apparatus,
- a vertical distance criterion of the mobile offshore apparatus with respect to the water surface and/or to a landing device of the further offshore apparatus,
- a pressure force criterion (magnitude and/or angle), and
- a horizontal distance criterion of the mobile offshore apparatus with respect to a landing device of the further offshore apparatus.

A heel angle criterion may be an allowable heel angle, in particular, an allowable heel angle range (e.g., between −5° and 5° with respect to a horizontal reference plane passing through the longitudinal axis). For a stable position of the mobile offshore apparatus, in particular, a reduction of the maximum rotation around the longitudinal axis, also called heeling, is required. In particular, depending on a predeterminable permissible heel angle range, at least one control parameter can be determined, in particular, calculated, by a computing module of a control unit (almost continuously).

In mobile offshore apparatuses, a movement about the transverse axis is called pitching. A pitch angle criterion may be an allowable pitch angle, in particular, an allowable pitch angle range (e.g., between −5° and 5° with respect to a horizontal reference plane passing through the transverse axis). For a stable position of the mobile offshore apparatus, in particular, a reduction of the maximum rotation around the transverse axis is required. In particular, depending on a predeterminable permissible pitch angle range, at least one control parameter can be determined, in particular, calculated, by a computing module of a control unit (almost continuously).

In mobile offshore apparatuses, a movement about the vertical axis is referred to as yaw. A yaw angle criterion can be an allowable yaw angle, in particular, an allowable yaw angle range (e.g. between −5° and 5°). For a stable position of the mobile offshore apparatus, in particular, a reduction of the maximum rotation around the vertical axis, also called yaw axis, is required. In particular, depending on a predeterminable permissible yaw angle range, at least one control parameter can be determined, in particular, calculated, by a computing module of a control unit (almost continuously).

Furthermore, as an alternative or in addition to the at least one angle criterion, a speed criterion, for example, a permissible speed value (e.g., approximately 0 km/h) or speed range (e.g., up to a maximum of 2 km/h), of the mobile offshore apparatus can be defined for the desired position location.

Also, in addition to the yaw angle criterion, a further bearing criterion of the mobile offshore apparatus may be predetermined. Also, the height of the mobile offshore apparatus (in particular, a suitable reference point, such as the bottom of the hull device, top of the landing platform, etc.) to the waterline may be defined, for example, by specifying a permissible vertical distance criterion of the mobile offshore apparatus with respect to the water surface (e.g. 2 m, between 1.8 m and 2.2 m) and/or to a landing device of the further offshore apparatus (e.g. 0 m, between −0.3 m and 0.3 m). Finally, a permissible horizontal distance criterion of the mobile offshore apparatus to a landing device of the further offshore apparatus (e.g., 0 m, between −0.1 m and 0.1 m) may be defined.

In addition to angle and distance criteria, acceleration criteria (in all axis directions as well as rotational directions about the respective axes) may be defined and velocity criteria may be defined horizontally and vertically.

In particular, a position parameter includes any position parameter in space (position, inclination, in each case triaxially) and also their respective time derivatives (axial or angular velocities and axial or angular accelerations).

As will be described further, the determination of the at least one control parameter and the generation of the set of control parameters, respectively, can be performed as a function of at least one (current) position parameter of the mobile offshore apparatus.

In order to be able to operate a mobile offshore apparatus in areas with a shallow water depth, according to a further embodiment of the hydrofoil device according to the application, the hydrofoil device may be movable in a vertical direction in its intended use. For example, the support may be movable in a vertical direction. A corresponding actuator unit may be provided. Alternatively or additionally, the hydrofoil device, in particular, the connection unit, may be formed to be foldable. For example, the mobile offshore apparatus may have a plurality of hydrofoil devices, at least one of which may be attached laterally to the at least one hull device. For intended use, a hydrofoil device may then be unfolded, for example, flipped open. After the intended use, the hydrofoil device can be folded and collapsed, respectively, again. In particular, a support configured as a connecting unit may have at least one folding mechanism and flipping mechanism, respectively.

A further aspect of the application is a mobile offshore apparatus, in particular, a watercraft, for landing at a further (stationary) offshore apparatus. The mobile offshore apparatus comprises at least one hull device. The mobile offshore apparatus comprises at least two hydrofoil devices connected to the hull device, as previously described. The mobile offshore apparatus comprises at least one control unit. The control unit is configured to provide the at least one control data set.

Preferably, the mobile offshore apparatus is a previously described mobile offshore apparatus that is, in particular, configured to land at a further offshore apparatus, such as a further mobile offshore apparatus or a stationary offshore apparatus, for example, a stationary offshore apparatus of an offshore wind farm.

The mobile offshore apparatus comprises at least two hydrofoil devices previously described, preferably at least three hydrofoil devices previously described. At least if only two hydrofoil devices are provided, the mobile offshore apparatus may additionally have at least one suspension unit and suspension point, respectively. With at least three hydrofoil units or at least two hydrofoil units and at least one suspension point, a stable (previously described) position location can be achieved during a landing process and, in particular, maintained even in the presence of (significant) wave heights greater than 1.5 m.

The mobile offshore apparatus comprises a control unit, in particular, in the form of a computing unit, which is configured to provide a previously described control data set. In particular, the providing may comprise the calculating and generating of at least one previously described control parameter to be set for achieving and maintaining the previously described position location.

In a first embodiment of the mobile offshore apparatus, the mobile offshore apparatus may comprise at least one position detecting unit. The position detecting unit may be configured to detect at least one (current) position parameter of the mobile offshore apparatus. The position detecting unit may be couplable to the control unit. In particular, the position detecting unit may provide the at least one detected position parameter to the control unit preferably almost continuously. The control unit may be configured to generate the at least one control data set depending on the at least one detected position parameter. In particular, by taking into account the current position location of the mobile offshore apparatus in the form of at least one position parameter, a control data set can be generated, in particular, calculated, which enables a desired (previously described) position location to be reached or maintained.

According to a further embodiment, the mobile offshore apparatus may comprise at least one motion detection unit that may be arranged to detect at least one motion parameter of the mobile offshore apparatus. The control unit may be arranged to generate the at least one control data set depending on the at least one detected motion parameter.

Preferably, the at least one position parameter of the mobile offshore apparatus may be selected from the group, comprising:
  a (current) heel angle of the mobile offshore apparatus with respect to the longitudinal axis of the mobile offshore apparatus,
  a (current) pitch angle of the mobile offshore apparatus with respect to the transverse axis of the mobile offshore apparatus,
  a (current) yaw angle of the mobile offshore apparatus with respect to the vertical axis of the mobile offshore apparatus,
  a (current) speed of the mobile offshore apparatus,
  a (current) vertical distance of the mobile offshore apparatus (in vertical direction) to the water surface and/or to a landing device of the further offshore apparatus,
  a (current) horizontal distance of the mobile offshore apparatus, in particular, the landing platform of the mobile offshore apparatus, (in horizontal direction) to a landing device of the further offshore apparatus.

Preferably, the position detecting unit may comprise at least one sensor for (almost continuously) measuring at least one of the aforementioned position parameters. Preferably, a plurality of suitable sensors may be provided. In particular, the control unit may be configured to generate control parameters such that the measured actual parameters meet a corresponding predetermined criterion (e.g., at least during the landing process). In particular, the set drive power, the set angle of rotation and/or the set angle of attack can be calculated in such a way that, for example, an actual heel angle remains within the predetermined permissible heel angle range. In a corresponding manner, the control parameters can be set to alternatively or preferably additionally comply with at least one further criterion described above.

Alternatively or preferably in addition to the at least one position parameter, motion parameters can also be detected and, in particular, taken into account, such as rate(s) of rotation and/or rate(s) of acceleration.

In particular, the control unit may be configured to transmit the at least one generated control parameter to the corresponding units and actuators, respectively, via a wired and/or wireless communication network of the mobile offshore apparatus.

According to a preferred embodiment of the mobile offshore apparatus, in order to achieve and, in particular, maintain a desired position location with an even higher reliability and/or in case of particularly unfavorable environmental conditions (particularly high waves, particularly strong flows, etc.), the control unit may be configured to generate the at least one control data set (with at least one control parameter) as a function of at least one provided environmental parameter of the mobile offshore apparatus. The at least one environmental parameter may be selected from the group, comprising:
  wave height (e.g., max. wave height, average wave height),
  (current and/or average) wind speed,
  (current and/or average) wind direction,
  (current and/or average) current direction,
  (instantaneous and/or average) current speed.

For example, the mobile offshore apparatus may comprise at least one sensor for (nearly continuously) measuring at least one of the aforementioned environmental parameters. Alternatively or additionally, the at least one environmental parameter may be provided by a further offshore apparatus. For example, an offshore wind farm may have corresponding measuring devices (measuring buoys, wind measuring mast, etc.). When a landing process is performed at an offshore apparatus of the offshore wind farm, the at least one environmental parameter detected by a measuring device of the corresponding offshore wind farm may be transmitted, for example, via a wireless communication network, to the control unit of the mobile offshore apparatus.

It has been recognized that eddies can be generated by a flow generator and/or the at least one hydrofoil of a first hydrofoil device of a mobile offshore apparatus, which can impair the surround flow of a further hydrofoil device arranged, in particular, adjacent to the first hydrofoil device. In order to at least reduce the impairment by the undesired vortices, it is proposed, according to the application in accordance with a further embodiment of the mobile offshore apparatus, that at least one guide plate can be connected to the hull device in such a way that the guide plate is arranged between the at least two hydrofoil devices. In particular, the guide plate may be movable at least in a vertical direction. By providing at least one corresponding guide plate, vortices can be prevented from reaching an adjacent hydrofoil device. At least the vortex effect can be weakened by a corresponding guide plate.

As has already been described, a hydrofoil device may preferably comprise an electric motor as a drive unit. According to a further embodiment, the mobile offshore apparatus may comprise at least one electric power supply unit. The electrical power supply unit may be configured to supply power to at least one drive unit of at least one hydrofoil device. The electrical power supply unit may comprise at least one first electrical connection module corresponding to a second electrical connection module of an offshore apparatus of an offshore wind farm. Alternatively or additionally, the electrical power supply unit may comprise at least one rechargeable battery. Alternatively or additionally, the electrical power supply unit may comprise a power generation unit (e.g., an internal combustion engine or gas turbine with generator or a fuel cell). Preferably, the power required to operate the electric drive units of the hydrofoil devices may be provided, at least in part, by the further offshore apparatus to be landed. In particular, in the event that the further offshore apparatus is an offshore apparatus of an offshore wind farm, it is advantageously possible to make use of the energy and power, respectively, generated by the offshore wind farm. This can eliminate the need for a battery arrangement on the mobile offshore apparatus, or at least (rechargeable) battery can be used with a low capacity. This reduces the dead weight of a mobile offshore apparatus, so that the weight that can be charged and transported can be increased in a corresponding manner.

According to a particularly preferred embodiment of the mobile offshore apparatus, the mobile offshore apparatus may comprise at least four hydrofoil devices connected to the hull device. The hull portion may comprise four corner regions. One hydrofoil device of each of the at least four hydrofoil devices may be arranged in each corner region. By means of a corresponding arrangement, a specific position can be achieved and, in particular, maintained in a simple and at the same time reliable manner.

In a preferred embodiment of a mobile offshore apparatus as a catamaran structure with two hulls, the corner regions can be formed by the four end regions of the hulls. The four hydrofoil devices can then span a rectangle, for example. By means of an appropriate arrangement of four hydrofoil devices on a catamaran structure, a specific position location can be achieved and, in particular, maintained in a particularly reliable manner.

According to a further embodiment, the hydrofoil devices, drive units and the flow generators can be used as a drive, as in conventional hydrofoil boats/hydrofoils, if appropriately aligned and controlled, respectively. In particular, the hydrofoil units and the flow generators can be used during transit within or into/out of the wind farm. In particular, in this configuration, sufficient forward speed can be achieved with only a portion of flow generators engaged (than is required to lift out and maneuver at a single point). Single control of the hydrofoils, drive units, and/or flow generators may also be advantageous in this configuration to limit wave-induced accelerations and angular changes, as well as to minimize flow resistance from lifting the hull out of the water.

A still further aspect of the application is a method of operating a mobile offshore apparatus described above, in particular, for landing at a further offshore apparatus. The method comprises:

providing at least one position parameter of the mobile offshore apparatus, generating at least one control data set based on the at least one provided position parameter, controlling the at least two hydrofoil devices, wherein the controlling comprises at least rotating the at least one hydrofoil device as a function of the at least one generated control data set about at least one substantially vertical axis of rotation of the hydrofoil device.

Generating the control data set may be performed, in particular, as has been previously described.

According to a first embodiment of the method according to the application, the controlling may comprise changing the angle of attack of the hydrofoil of at least one hydrofoil device as a function of at least one generated control data set.

Alternatively or preferably additionally, the controlling may comprise a changing of the angle of attack of at least one end strip flap of the hydrofoil mounted to the hydrofoil device as a function of at least one control data set that can be provided. Alternatively, or preferably additionally, the controlling may comprise changing the drive power of the flow generator of at least one hydrofoil device as a function of at least one generated control data set. In particular, generating the control data set and controlling the corresponding units/actuators may be performed as has been described previously.

According to a preferred embodiment of the method according to the application, the controlling of the at least two hydrofoil devices may be performed in such a way that the mobile offshore apparatus reaches (and, in particular, maintains during a specific period of time (e.g., during the landing process)) a predeterminable position location. The predeterminable position location may be defined (as has been described above) by at least one criterion selected from the group comprising:

a heel angle criterion of the mobile offshore apparatus with respect to the longitudinal axis of the mobile offshore apparatus, a pitch angle criterion of the mobile offshore apparatus with respect to the transverse axis of the mobile offshore apparatus, a yaw angle criterion of the mobile offshore apparatus with respect to the vertical axis of the mobile offshore apparatus, a speed criterion of the mobile offshore apparatus, a vertical distance criterion of the mobile offshore apparatus with respect to the water surface and/or to a landing device of the further offshore apparatus, and a horizontal distance criterion of the mobile offshore apparatus with respect to a landing device of the further offshore apparatus.

In addition, a further aspect of the application may be the use of at least two previously described hydrofoil devices to operate a previously described mobile offshore apparatus.

It shall be understood that a unit according to the application may be formed at least in part of software and/or at least in part of hardware (e.g., processor, storage medium, interfaces, etc.).

The features of the hydrofoil devices, mobile offshore apparatuses, methods and uses may be freely combined with each other. In particular, features of the description and/or dependent claims may be independently inventive, even by completely or partially bypassing features of the independent claims, alone or freely combined with each other.

BRIEF DESCRIPTION OF THE FIGURES

There are now a plurality of possibilities for designing and further developing the hydrofoil device according to the application, the mobile offshore apparatus according to the application, the method according to the application and the use according to the application. For this purpose, reference is made on the one hand to the patent claims subordinate to the independent patent claims, and on the other hand to the description of embodiments in connection with the drawing. In the drawing shows:

In the figures, the same reference signs are used for the same elements.

DETAILED DESCRIPTION

Figure 1:
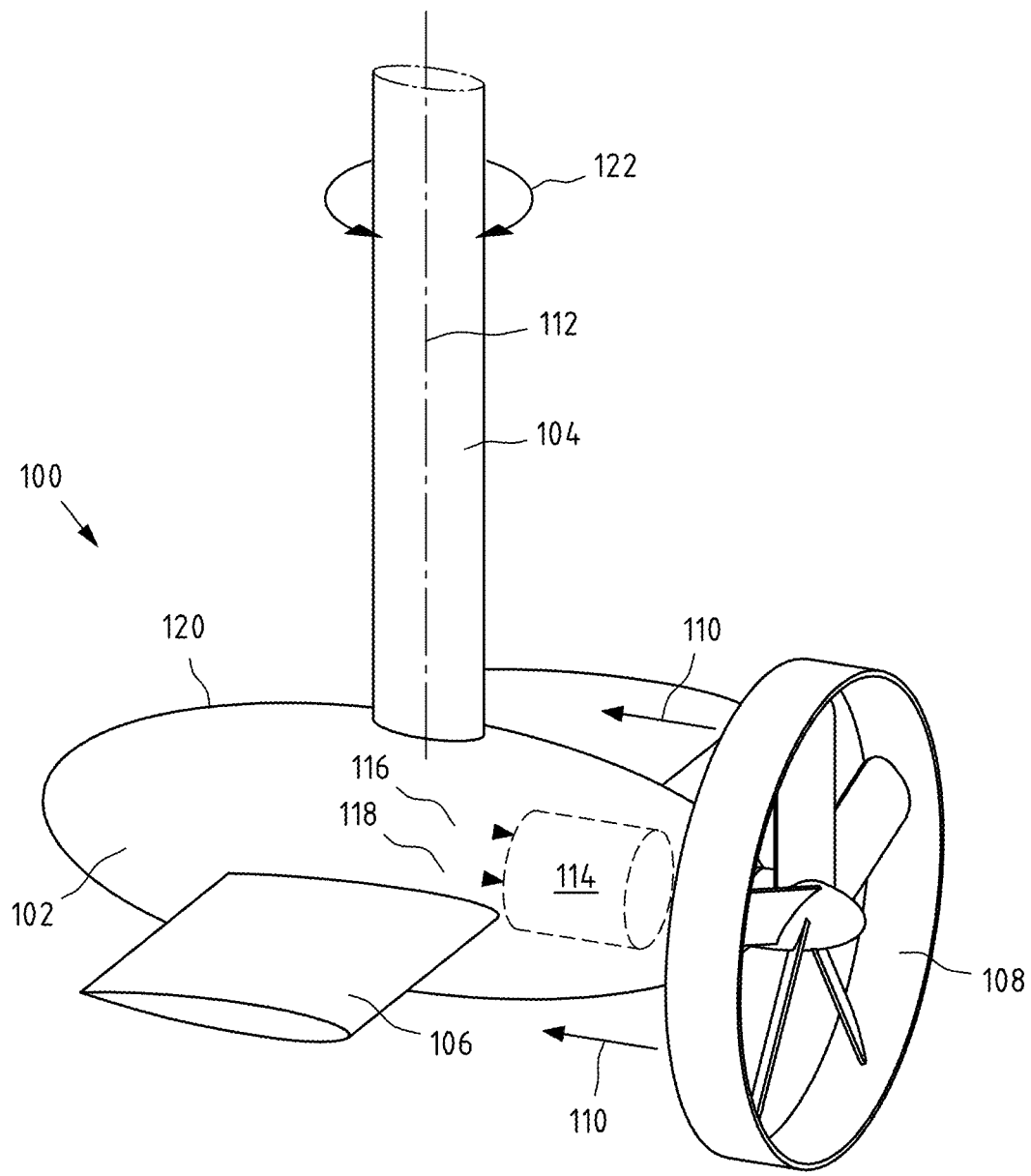
FIG. 1 a schematic view of an embodiment of an hydrofoil device according to the present application, FIG. 2 a schematic bottom view of an embodiment of a mobile offshore apparatus according to the present application, FIG. 3 a schematic side view of an embodiment of a mobile offshore apparatus according to the present application, and FIG. 4 a diagram of an embodiment of a method according to the present application.

FIG. 1 shows a schematic perspective view of an embodiment of a hydrofoil device 100 according to the present application. As can be seen from FIG. 1, the illustrated hydrofoil device 100 comprises a base body 102, two hydrofoils 106, a connecting unit 104 and a flow generator 108.

The hydrofoils 106 are mounted to the outer side surfaces of the base body 102. For example, the hydrofoils 106 may be mounted by a suitable joining method (e.g., welding, bonding, etc.). It is also conceivable that a base body and the at least one hydrofoil are formed integrally.

Presently, a flow generator 108, in particular, in the form of a propeller or impeller, is disposed at a longitudinal end of the base body 102. The flow generator 108 may be driven by a drive unit 114. In the present, preferred embodiment, the drive unit 114 is arranged within the base body 102. In particular, the drive unit 114 may be integrated in the housing 120 of the base body 102. Alternatively, the drive unit may be arranged at another position of a (not shown) mobile offshore apparatus.

Particularly preferably, the drive unit 114 may be an electric motor 114. Electrical power may be supplied to the electric motor 114 via an electrical connection 116 and electrical network 116, respectively, in particular, at least one electrical line 116. For example, the electrical line 116 may extend through the base body 102 and through the connection unit 104 to an electrical power supply unit (not shown) of the mobile offshore apparatus.

In other variants of the application, additional components, such as a rechargeable battery, a gearbox, a local control system, etc., may be arranged within the base body. In still further variants of the application, an engine (e.g., electric motor, internal combustion engine, gas turbine, and/or fuel cell) may be arranged on board of a mobile offshore apparatus to which the hydrofoil device 100 may be mountable. In particular, such a motor may be connected to the at least one flow generator 108 via an operative connection, in particular, comprising a reversing gear.

The flow generator 108 is configured to generate a surround flow 110 of the hydrofoil 106. By actively generating a surround flow, sufficient buoyancy can be generated to lift the mobile offshore apparatus relative to the water surface.

Preferably, the flow generator 108 may be a controllable flow generator 108, to generate, in particular, varying flow velocities. For example, in the case of a propeller or impeller, the rotational speed may be changed depending on the power.

In particular, a (wired or wireless) communication network 118 may be provided. At least one control data set comprising at least one control parameter (e.g., set power, set speed, etc.) may be transmitted to the drive unit 114 via the communication network 118.

Moreover, in its intended use, the hydrofoil device 100 is rotatable at least about a substantially vertical axis of rotation 112 (indicated by the arrow 122) as a function of at least one control data set that can be provided. In particular, a rotation angle (in the range of 0° to 360°) can be provided as a control parameter. In the present example, the axis of rotation 112 is identical to the longitudinal axis of the connecting unit 104 configured as a support 104. It shall be understood that this may not be the case in other variants of the application.

In particular, in the present embodiment, the support 104 may be rotatably mounted to the mobile offshore apparatus. Therefore, in the present embodiment, a rotation of the hydrofoil device 100 is caused by a rotation of the support 104.

In a variant of the application not shown, the hydrofoil device may comprise at least one controllable and adjustable end strip (bar) flap. In particular, the angle of attack may be adjustable in such an e strip nd slat flap.

Figure 2:
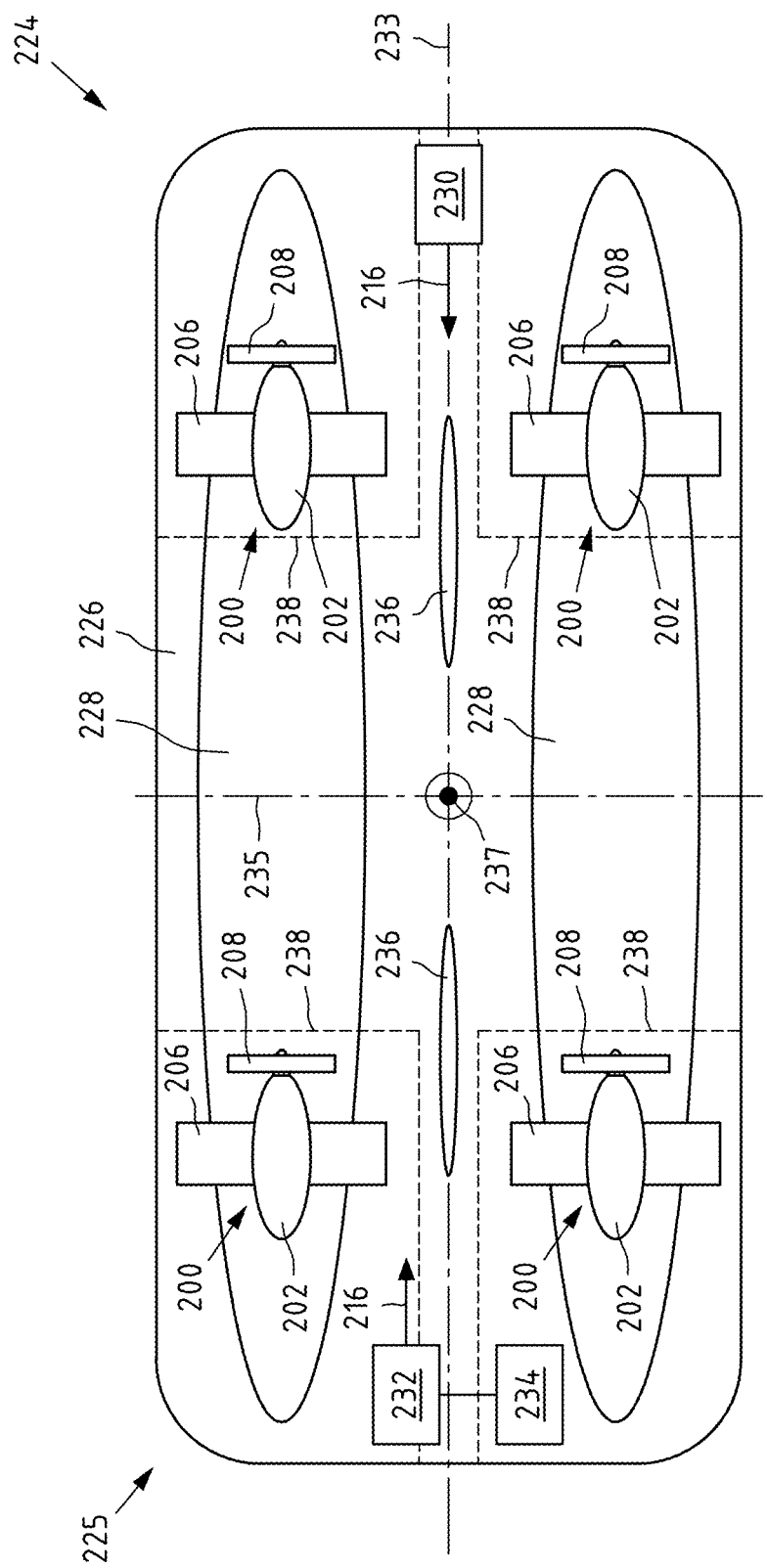

FIG. 2 illustrates a schematic view of an embodiment of a mobile offshore apparatus 224. In particular, a bottom view of the mobile offshore apparatus 224 is shown. The mobile offshore apparatus 224 comprises a plurality of hydrofoil devices 200. In particular, a depicted hydrofoil device 200 may be formed according to the hydrofoil device 100 according to the embodiment of FIG. 1, which is referred to here in order to avoid repetition.

In the present embodiment, the mobile offshore apparatus 224 is a catamaran structure 224 comprising a hull device 225 (shown schematically). The hull device 225 includes two hulls 228 and a transport and/or landing platform 226 attached to the hulls 228.

As can be seen, the hull device 225 comprises four corner regions 238. In each of these corner regions 238 a hydrofoil device 200 is arranged. In particular, a corner region 238 includes the four ends of the two hulls 228. Presently, one hydrofoil device 200 is disposed at each of these four ends. In particular, a hydrofoil device 200 may be mounted to the hull device 225 and the corresponding hull 228, respectively, via the previously described connection unit.

Since undesirable (water) vortices may be generated by a hydrofoil device 200 during the intended use, which may affect the lift of an adjacent hydrofoil device 200, the present mobile offshore apparatus 224 comprises at least one guide plate 236. The guide plate 236 may be movable in at least one vertical direction. Preferably, the guide plate 236 may be movable in further directions. This may at least reduce the interference with vortices.

Furthermore, the mobile offshore apparatus comprises a longitudinal axis 233, a transverse axis 235 and a vertical axis 237. A rotating of the mobile offshore apparatus 224 about the longitudinal axis 233 is, in particular, referred to as heeling. The amount of heeling is represented by the angle of heel of the mobile offshore apparatus 224 with respect to the longitudinal axis 233 of the mobile offshore apparatus 233. In particular, a rotating of the mobile offshore apparatus 224 about the transverse axis 235 is referred to as pitching. The extent of pitching is represented by the pitch angle of the mobile offshore apparatus 224 with respect to the transverse axis 235 of the mobile offshore apparatus 224. A rotating of the mobile offshore apparatus 224 about the vertical axis 237 is, in particular, referred to as yawing. The extent of yawing is represented by the yaw angle of the mobile offshore apparatus 224 with respect to the yaw axis 237 of the mobile offshore apparatus 224.

In particular, a stable attitude position (position location) of the mobile offshore apparatus 224 exists when the heel angle meets a predetermined heel angle criterion (such as a predetermined heel angle range) during a predetermined period of time, the pitch angle meets a predetermined pitch angle criterion (such as a predetermined pitch angle range) during a predetermined period of time, and the yaw angle meets a predetermined yaw angle criterion (such as a predetermined yaw angle range) during a predetermined period of time. For example, the predetermined period of time may represent the period of time for a landing process. It shall be understood that other criteria may be predetermined.

In order to ensure that these are met, the mobile offshore apparatus 224 may comprise at least one position and/or motion detecting unit 234, which may comprise, for example, a plurality of sensors. The sensors may, for example, measure (almost continuously) as position parameters the current heel angle, the current pitch angle, and/or the current yaw angle, and provide the detected values to a control unit 232. It shall be understood that according to other variants of the application, further (previously described) position parameters may be detected and provided. Alternatively or additionally, the sensors may detect rotation rates and accelerations as motion parameters.

Based on the provided position parameters and, in particular, predetermined criteria for a specific position, the control unit 232 can generate at least one control data set with control parameters such that the desired and specific, respectively, position is reached and, in particular, maintained during the determined period of time. In particular, the control parameters may be (almost) continuously adjusted by the control unit 232 according to the (almost) continuously detected position parameters.

Preferably, the (not shown) drive units of the hydrofoil devices 200 can be electric drive units that can be supplied with electric power and electric current, respectively, by an electric power supply unit 230 via an electric network 216. In other variants, a hydrofoil device may comprise at least one end strip flap.

Figure 3:
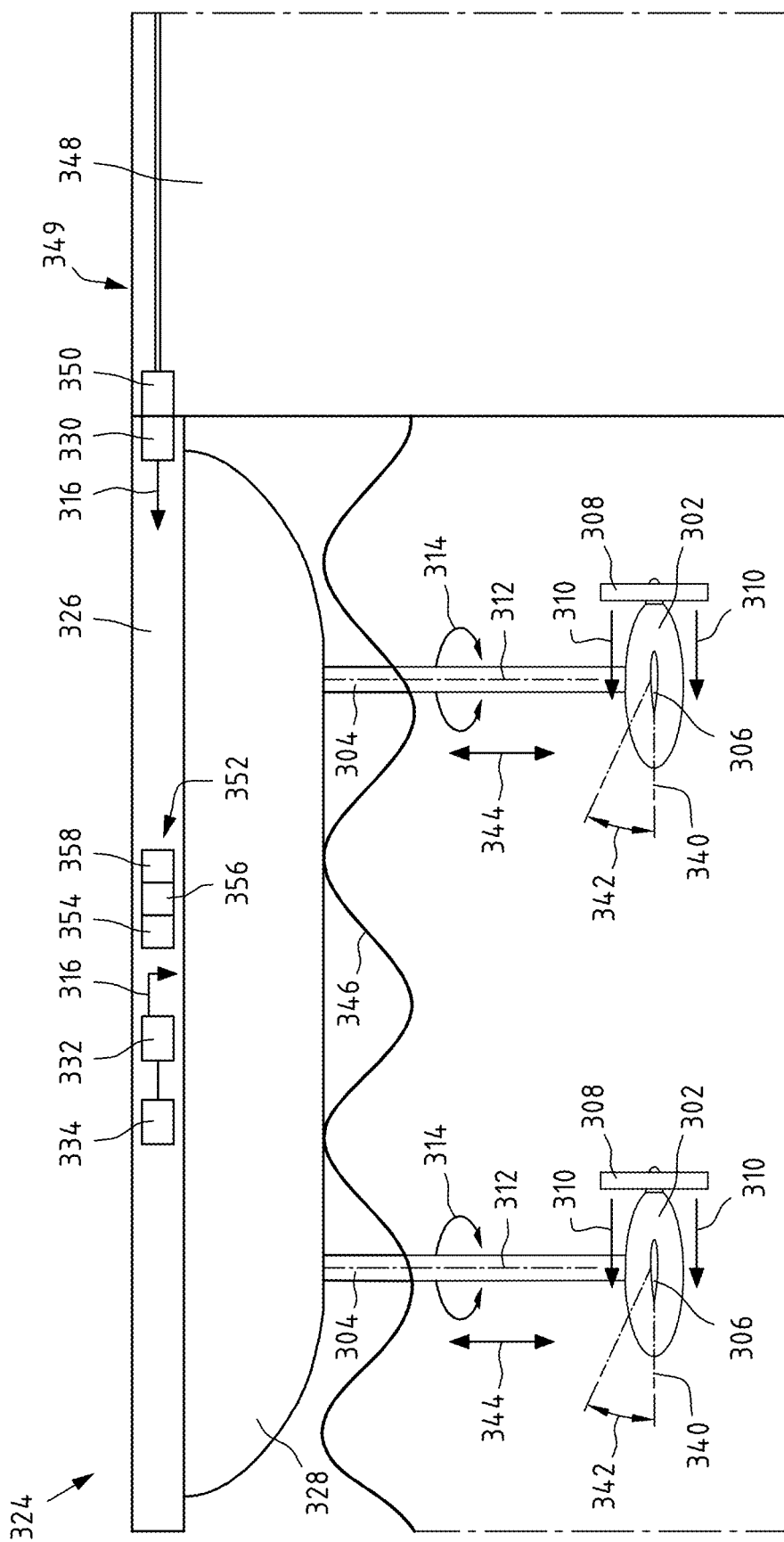

FIG. 3 shows a schematic view of an embodiment of a mobile offshore apparatus 324. In particular, a schematic side view of an embodiment of a mobile offshore apparatus 324 is shown. For example, the mobile offshore apparatus 324 may be the previously described embodiment shown in FIG. 2, which is referred to here in order to avoid repetition.

FIG. 3 shows a mobile offshore apparatus 324, in particular a catamaran structure 324, during a landing operation at a further, in this case stationary, offshore apparatus 348. For example, the offshore apparatus 348 (e.g. a wind turbine) is an offshore wind turbine 348 of an offshore wind farm.

The catamaran structure 324 may comprise an electrical power supply unit 330, in particular, in the form of a first electrical connection module 330. The first electrical connection module 330 of the catamaran structure 324 may mechanically and/or electrically correspond to a second electrical connection module 350 of the offshore apparatus 348. Optionally, the catamaran structure 324 and/or one, preferably each, hydrofoil device 300 may further comprise at least one (not shown) rechargeable battery. The connection modules 330, 350 may be, for example, plug-in modules (e.g., plug and socket) or inductively operating modules.

Advantageously, the energy and power, respectively, generated by the offshore wind farm can be used. This may eliminate the need for a battery arrangement on the mobile offshore apparatus 324, or at least a (rechargeable) battery may be used with a low capacity.

The electrical energy and power, respectively, can be transmitted to the electrical drive units of the hydrofoil devices 300 via an electrical network 316, in particular, electrical lines 316.

The mobile offshore apparatus 324 further comprises at least one position and/or motion detecting unit 334 and at least one control unit 332. As described above, the position detecting unit 334 can preferably detect a plurality of position parameters, such as heel angle, pitch angle, yaw angle, vertical distance to the water surface and/or to the landing device 349, horizontal distance between the mobile offshore apparatus 324 and the landing device 349, speed of the mobile offshore apparatus 324, etc. As (also already) described above, based on the detected position parameters and, in particular, corresponding predetermined criteria, the control unit 332 may generate at least one control data set 352 with control parameters 354, 356 and 358 that allow reaching the determined position location and, in particular, maintaining the determined position location during a determined period of time. In particular, the control parameters 354, 356 and 358 may be adjusted almost continuously according to the detected position parameters by the control unit 332.

Preferably, as the control parameters 354, 356 and 358 at least a set angle of rotation 354, a set angle of attack 356 and/or a set drive power 358 (e.g. set speed, set power value, etc.) can be generated. The communication network 316 can be used to transmit the control parameters 354, 356, and 358 to the corresponding actuators (not shown). According to the control parameters, the actuators adjust the angle of rotation about the vertical axis of rotation 312 of the corresponding hydrofoil device 300, adjust the angle of attack 342 (e.g., between −45° and +45° with respect to a horizontal plane 340) of the corresponding hydrofoil device 300, and/or adjust the drive power of the corresponding drive unit of the corresponding hydrofoil device 300.

It shall be understood that instead of a single control data set, a plurality of control data sets may be generated, each comprising, for example, only one control parameter. Moreover, it shall be understood that each hydrofoil device 300, in particular, each individual actuator of a hydrofoil device, may be individually controllable.

It shall be further understood that a mobile offshore apparatus may comprise further components, such as superstructures, etc., which, however, have not been shown herein for the sake of a better overview. The same applies accordingly to the further offshore apparatus.

Finally, a hydrofoil device 300 may also be movable in a vertical direction 344. This allows the mobile offshore apparatus 324 to be operated in waters of shallow depth, and to be raised higher above the water level, respectively. In other variants of the application, the hydrofoil device 300 may alternatively or additionally be movable in a horizontal direction.

Figure 4:
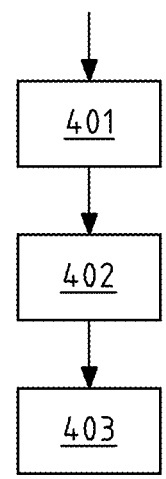

FIG. 4 shows a diagram of an embodiment of a method for operating a mobile offshore apparatus, in particular, a previously described mobile offshore apparatus 224, 324. In particular, performing a landing process of the mobile offshore apparatus 224, 324 to another offshore apparatus 348 is shown in FIG. 4.

In a first step 401, at least one position parameter of the mobile offshore apparatus may be provided to a control unit as previously described. In a next step 402, at least one control data set may be generated based on the at least one provided position parameter, as has been previously described.

Then, in step 403, at least one hydrofoil device may be controlled, wherein controlling comprises at least rotating the at least one hydrofoil device based on the at least one generated control data set about at least a substantially vertical axis of rotation of the hydrofoil device. As has been described, further control parameters may be generated and the corresponding actuators may be controlled accordingly.

It shall be understood that at least two of the previously described steps may be performed at least partially in parallel.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed:

1. Mobile offshore apparatus, for landing at a stationary offshore apparatus comprising:
   at least one hull device,
   at least two hydrofoil devices connected to each of the at least one hull device wherein each hydrofoil device comprises:
      at least one base body with at least one connection unit, which is configured to connect each hydrofoil device to each of the at least one hull device,
      at least one hydrofoil arranged on the base body,
      at least one flow generator arranged on the base body, which is configured to generate a surround flow of each hydrofoil device,
      wherein each hydrofoil device is rotatable about at least one substantially vertical axis of rotation as a function of at least one providable control data set, and
   at least one control unit which is configured to provide the at least one control data set,
   at least one guide plate connected to each of the at least one hull device, such that the guide plate is arranged between the at least two hydrofoil devices,
   wherein the guide plate is movable at least in a vertical direction.

2. Mobile offshore apparatus according to claim 1, wherein
   the base body comprises at least one drive unit which is configured to drive the flow generator.

3. Mobile offshore apparatus according to claim 1, wherein each hydrofoil device is configured to change at least one of
   a first angle of attack of each hydrofoil device as a function of at least one providable control data set,
   a second angle of attack of at least one end strip flap of each hydrofoil device mounted on each hydrofoil device as a function of at least one providable control data set, or
   a drive power of the flow generator as a function of at least one providable control data set.

4. Mobile offshore apparatus according to claim 1, wherein each hydrofoil device is at least one of
   movable in at least one of a vertical direction or in a horizontal direction, or
   formed to be foldable.

5. Mobile offshore apparatus according to claim 1, wherein
   the mobile offshore apparatus comprises at least one position detecting device which is configured to detect at least one position parameter of the mobile offshore apparatus, and
   the control unit is configured to generate the at least one control data set as a function of the at least one detected position parameter.

6. Mobile offshore apparatus according to claim 1, wherein
   the mobile offshore apparatus comprises at least one motion detection unit which is configured to detect at least one motion parameter of the mobile offshore apparatus, and
   the control unit is configured to generate the at least one control data set as a function of the at least one detected motion parameter.

7. Mobile offshore apparatus according to claim 5, wherein in that the at least one position parameter of the mobile offshore apparatus is selected from the group, comprising:
   a heel angle of the mobile offshore apparatus with respect to a longitudinal axis of the mobile offshore apparatus,
   a pitch angle of the mobile offshore apparatus with respect to a transverse axis of the mobile offshore apparatus,
   a yaw angle of the mobile offshore apparatus with respect to a vertical axis of the mobile offshore apparatus,
   speed of the mobile offshore apparatus,
   a vertical distance of the mobile offshore apparatus to at least one of a water surface or a landing device of the stationary offshore apparatus,
   a horizontal distance of the mobile offshore apparatus in a horizontal direction to a landing device of the stationary offshore apparatus.

8. Mobile offshore apparatus according to claim 5, wherein
   the control unit is configured to generate the at least one control data set as a function of at least one provided environmental parameter of the mobile offshore apparatus,
   wherein the at least one environmental parameter is selected from the group, comprising:
      wave height,
      wind speed, wind direction,
flow direction,
flow velocity.

9. Mobile offshore apparatus according to claim 1, wherein
the mobile offshore apparatus comprises at least one electric power supply unit which is configured to supply power to at least one drive unit of at least one hydrofoil device,
wherein the electrical power supply unit comprises at least one of at least one first electrical connection module corresponding to a second electrical connection module of a stationary offshore apparatus of an offshore wind farm, or at least one rechargeable battery.

10. Mobile offshore apparatus according to claim 1, wherein
the mobile offshore apparatus comprises at least four hydrofoil devices connected to each of the at least one hull device,
wherein each of the at least one hull device comprises four corner regions, and
wherein a respective hydrofoil device is arranged in a respective corner region.

11. Method of operating a mobile offshore apparatus according to claim 1, for landing at a stationary offshore apparatus, comprising:
providing at least one position parameter of the mobile offshore apparatus,
generating at least one control data set based on the at least one provided position parameter,
controlling the at least two hydrofoil devices, wherein the controlling comprises at least rotating the at least one hydrofoil device as a function of the at least one generated control data set about at least one substantially vertical axis of rotation of each hydrofoil device.

12. Method according to claim 11, wherein the controlling comprises at least one of
changing an angle of attack of each hydrofoil device of at least one hydrofoil device as a function of at least one generated control data set,
changing the angle of attack of at least one end strip flap of each hydrofoil device mounted to each hydrofoil device as a function of at least one providable control data set, or
changing a drive power of the flow generator of at least one hydrofoil device as a function of at least one generated control data set.

13. Method according to claim 11, wherein
the controlling of the at least two hydrofoil devices is performed such that the mobile offshore apparatus reaches a predeterminable position location,
wherein the predeterminable position location is defined by at least one criterion selected from the group, comprising:
a predeterminable heel angle criterion of the mobile offshore apparatus with respect to a longitudinal axis of the mobile offshore apparatus,
a predeterminable pitch angle criterion of the mobile offshore apparatus with respect to a transverse axis of the mobile offshore apparatus,
a predeterminable yaw angle criterion of the mobile offshore apparatus with respect to a vertical axis of the mobile offshore apparatus,
a predeterminable speed criterion of the mobile offshore apparatus,
a predeterminable vertical distance criterion of the mobile offshore apparatus with respect to at least one of a water surface or a landing device of the stationary offshore apparatus, and
a predeterminable horizontal distance criterion of the mobile offshore apparatus with respect to a landing device of the stationary offshore apparatus.

14. Mobile offshore apparatus of claim 2, wherein the drive unit is an electric motor.

15. Mobile offshore apparatus of claim 7, wherein the horizontal distance of the mobile offshore apparatus is the horizontal distance of a landing platform of the mobile offshore apparatus.

16. A watercraft for landing at an offshore apparatus, comprising:
at least one hull device,
at least two hydrofoil devices connected to each of the at least one hull device wherein each hydrofoil device comprises:
at least one base body with at least one connection unit, which is configured to connect each hydrofoil device to each of the at least one hull device,
at least one hydrofoil arranged on the base body,
at least one flow generator arranged on the base body, which is configured to generate a surround flow of each hydrofoil device,
wherein each hydrofoil device is rotatable about at least one substantially vertical axis of rotation as a function of at least one providable control data set, and
at least one control unit which is configured to provide the at least one control data set,
at least one guide plate connected to each of the at least one hull device, such that the guide plate is arranged between the at least two hydrofoil devices,
wherein the guide plate is movable at least in a vertical direction.

* * * * *